United States Patent [19]

Morgan

[11] Patent Number: 5,575,336
[45] Date of Patent: Nov. 19, 1996

[54] SAFETY VALVE FOR HORIZONTAL TREE

[75] Inventor: Michael G. Morgan, Limeklins, Scotland

[73] Assignee: FMC Corporation, Chicago, Ill.

[21] Appl. No.: 386,387

[22] Filed: Feb. 10, 1995

[30] Foreign Application Priority Data

Feb. 10, 1994 [GB] United Kingdom ............... 9402583

[51] Int. Cl.$^6$ ..................................... E21B 34/12
[52] U.S. Cl. ................... 166/330; 166/95.1; 251/309
[58] Field of Search ..................... 166/86.3, 95.1, 166/330, 373, 386, 97

[56] References Cited

U.S. PATENT DOCUMENTS

| | | | |
|---|---|---|---|
| 2,710,066 | 6/1955 | Johnston et al. | 166/330 |
| 4,210,207 | 7/1980 | McStravick et al. | 166/330 |
| 4,434,967 | 3/1984 | Vanderburg | 251/328 |
| 4,508,173 | 4/1985 | Read | 166/330 |
| 4,513,823 | 4/1985 | Hynes et al. | 166/386 |
| 4,522,266 | 6/1985 | Barrington | 166/330 |
| 4,700,782 | 10/1987 | Read | 166/330 |
| 4,703,807 | 11/1987 | Weston | 166/373 |
| 5,305,988 | 4/1994 | Cox | 166/330 X |

FOREIGN PATENT DOCUMENTS

| | | | |
|---|---|---|---|
| 0280805A1 | 7/1988 | European Pat. Off. | F16K 3/02 |
| 1338109 | 11/1973 | United Kingdom | F16K 5/20 |
| 1422011 | 1/1976 | United Kingdom | F16K 3/16 |
| 2142416A | 1/1985 | United Kingdom . | |

Primary Examiner—Frank Tsay
Attorney, Agent, or Firm—Henry C. Query, Jr.

[57] ABSTRACT

A safety valve for use in a horizontal christmas tree is disclosed which comprises a valve element rotatably mounted in a valve body for opening and closing a flow path through the valve body. A seal is provided between the valve body and valve element and defines a sealing surface at which all points are spaced equidistant from the valve body rotational axis. A hydraulic actuator is also provided for rotating the valve element.

14 Claims, 4 Drawing Sheets

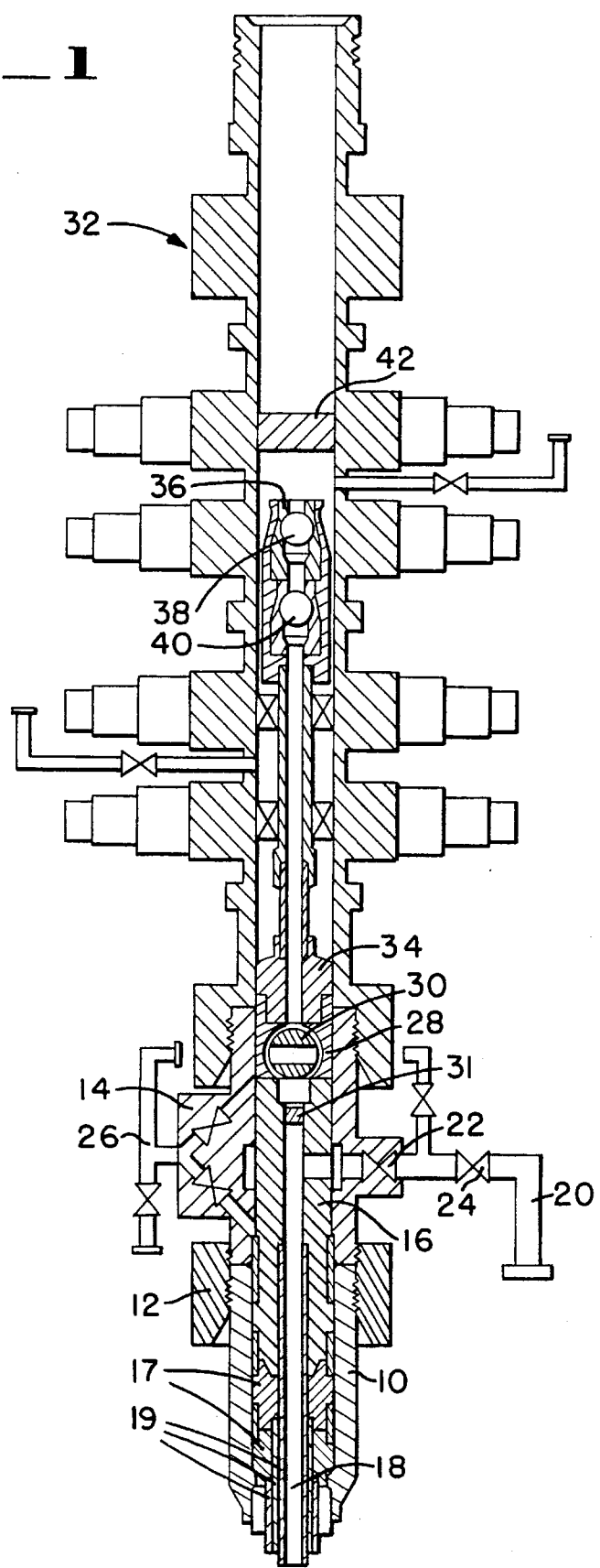
FIG_1

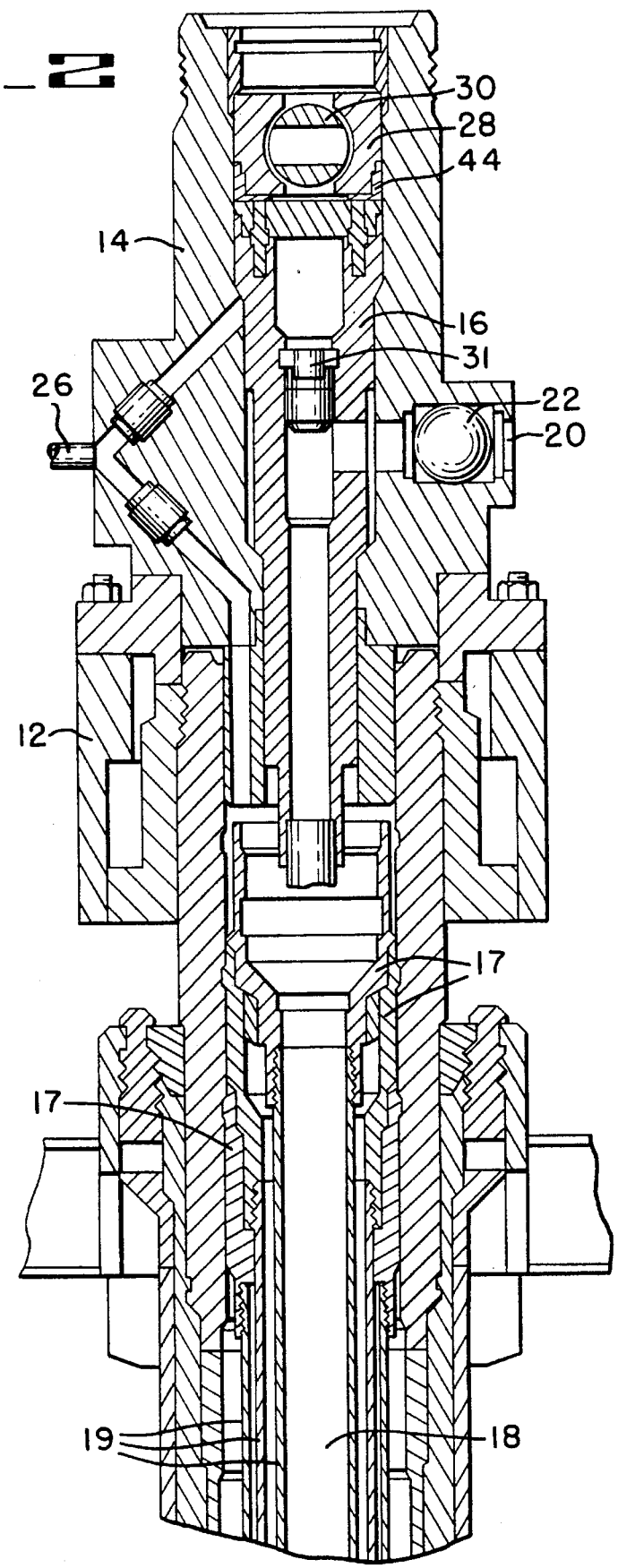
FIG_2

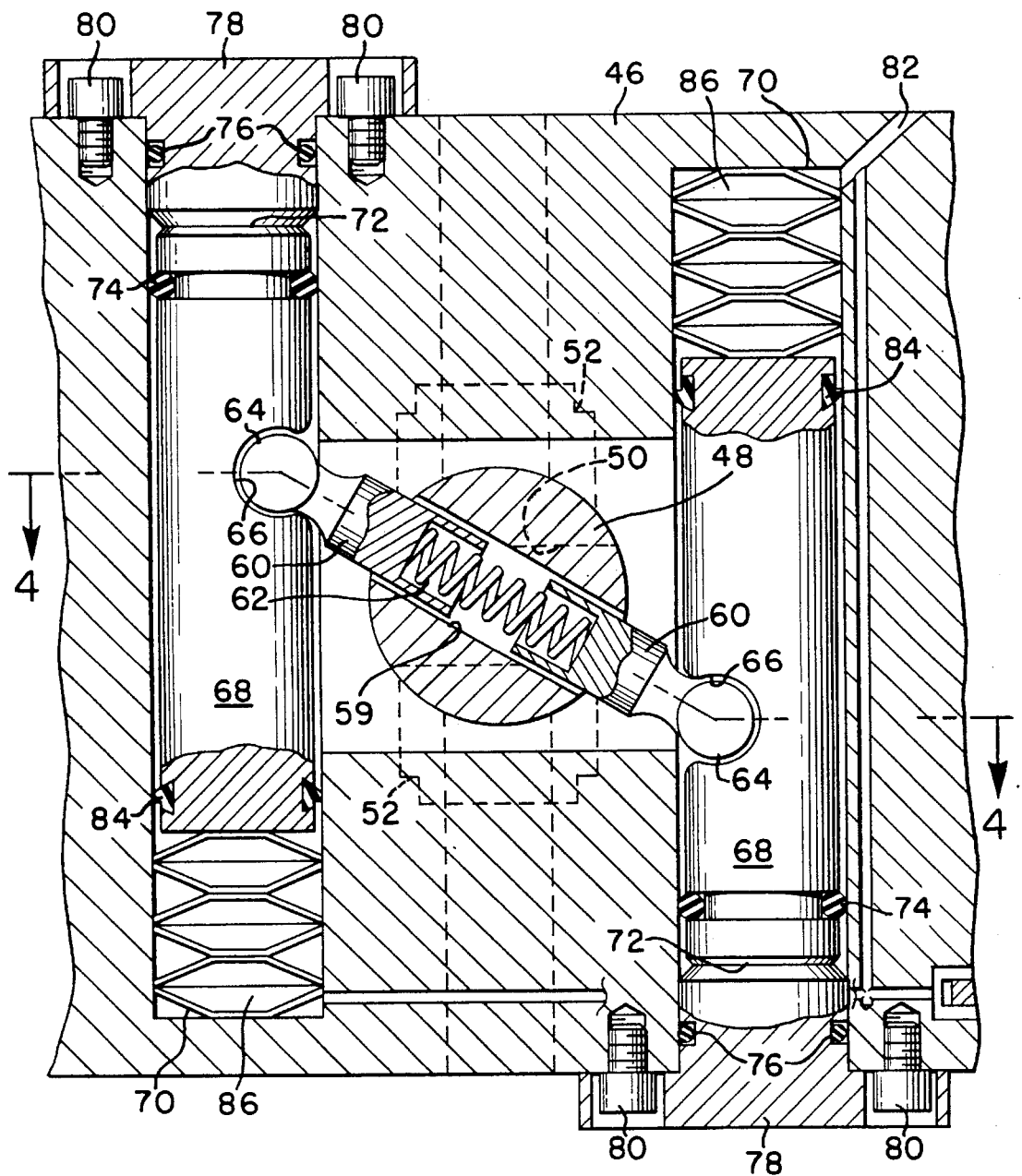
FIG_3

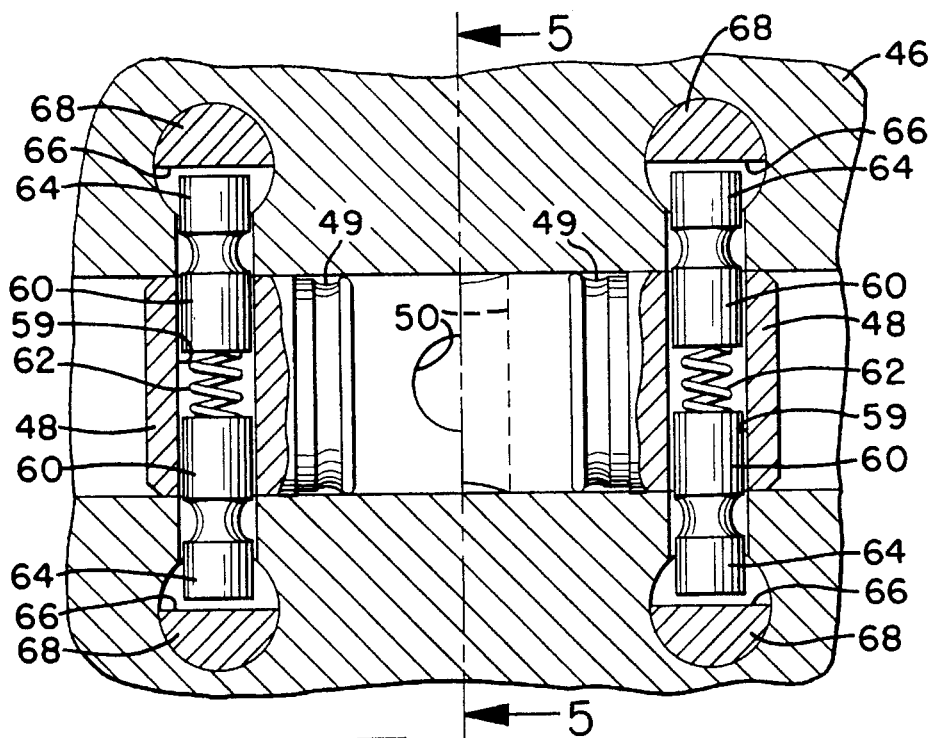
FIG_4
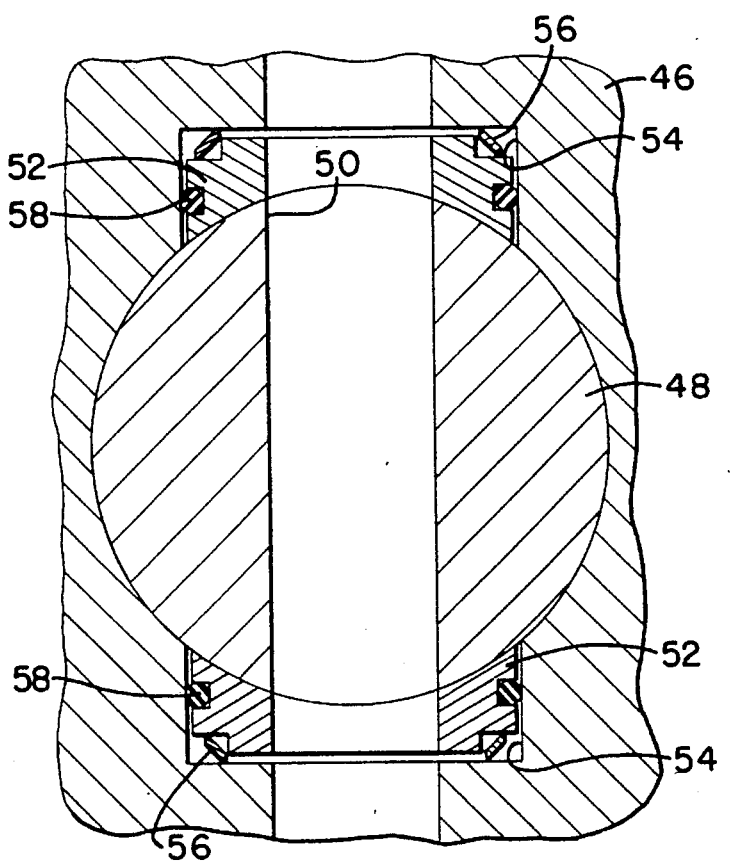
FIG_5

SAFETY VALVE FOR HORIZONTAL TREE

BACKGROUND OF THE INVENTION

The horizontal, or spool, tree evolved from early through bore tree concepts as a means to retrieve production tubing and downhole equipment "through the bore" of the subsea tree in an effort to simplify equipment requirements and workover operations. Through bore trees were limited to single string completions and equipment of dimensions that could pass through seven-inch (178 mm) master and swab gate valves. Other penetrations, such as hydraulic stabs and electrical connectors, had to exit through side outlets in a tubing head below the tree.

With increasing demands for safety, operability, and cost; as well as the need to accommodate such equipment as electrical submersible pump (ESP) completions, the horizontal tree has developed to provide larger, multi-bore tubing hangers with additional penetrations to access and control down hole equipment. Due to its large bore configuration, the horizontal tree enables well control and vertical access to downhole equipment through a conventional marine drilling riser connected to a subsea blowout preventer (BOP), via a lower marine riser package (LMRP), eliminating the need for costly and specialized completion risers. The horizontal tree provides full downhole access without having to remove the tree or disturb any external connectors to flowlines, service lines, or central umbilicals.

A horizontal subsea tree generally comprises the same components found in conventional subsea trees such as tubing heads subsea valves, tubing hangers, and well head connectors. These components are, however, installed in a different order than in conventional trees. In a horizontal tree the wellhead is installed first, followed by the tree, the tubing hanger, and the tree cap, respectively. In a conventional tree the tubing hanger is installed before the tree. The order of installation in a horizontal tree eliminates a significant amount of intervention steps and equipment during workovers. It also eliminates certain equipment and reduces run time required for installation.

A key feature of the horizontal tree is the utilization of an internal plug fitted within the tubing hanger to redirect vertical flow through a horizontal side outlet. The tubing hanger has one or more horizontal side outlets for well bore and/or control fluids. After the tubing hanger is in place, a tubing plug is installed just above a side outlet to provide a first barrier and to redirect flow to that side outlet. Vertical access to the production bore is maintained once the plug has been removed to satisfy installation and workover requirements. In a conventional tubing hanger, a similar plug is used as a temporary pressure barrier during the installation process.

In accordance with National Rules and Regulations of some countries where subsea wellhead equipment may be operated, a double barrier must be maintained at all times to prevent leakage of well fluids. In a conventional tree, the barriers are comprised of the master and swab valves. In a horizontal tree, the barriers are comprised of removable plugs. For instance, one plug may be placed in the tubing hanger and the other, a full bore plug, placed in or over the top of the tree mandrel. Other arrangements are also possible.

In a horizontal tree the tree cap provides the second, full bore vertical pressure barrier behind the tubing hanger plug and the tubing hanger annulus seals. The tree cap may be one of two types: internal or external. Internal tree caps are run through the subsea BOP and drilling riser, establishing a second static barrier. External tree caps are installed with a separate running tool and work string after the BOP is disconnected and recovered. Their use may be limited, however, since during the operation in which they are run there is only a single barrier controlling a "live" well and the well may be required to be "killed". When the well is "killed", a heavy brine solution is introduced forming a hydrostatic head which serves as a first barrier.

Workover operations typically involving the use of wireline or coiled tubing tooling, require entry into the well through the christmas tree. Workover operations on a well with a conventional tree are carried out using a workover system comprising a safety package and a workover riser, which provides communication between the safety package and the pressure controlling equipment at the surface. The safety package includes a wire shearing valve and an emergency disconnect package (EDP). The workover system typically comprises a dual string assembly to provide communication with the production bore and the annulus. In a conventional tree it is required to install a workover system in place of the tree cap in order to accommodate entry into the well.

A horizontal tree does not require a dedicated workover system, but instead relies upon the use of a BOP stack and a subsea test tree (SSTT). The SSTT is run into the BOP stack on the high pressure tubing riser to which it is joined via a quick disconnect. The lower end of the SSTT is connected to the tubing hanger running tool, which may also be used to run and retrieve the full bore plug or tree cap. The BOP stack and the SSTT provide emergency shutoff sealing and disconnecting capability. The SSTT further provides an upper ball valve having wire shearing capability, and a lower ball valve.

Entry into the well in a conventional tree is through the barriers provided by the swab valve and the master valves. These valves can be opened to permit entry of tools into the well during a workover operation after the safety package has been installed. The barrier may be actuated selectively to open and close at any time while the safety package is in place. In the case of a horizontal tree, the well can be accessed only after the two barriers have been removed, rather than opened.

In the situation where a live, i.e. at full pressure, well is undergoing workover operations in which a workover system and wireline tool are installed, and an incident occurs which requires detachment of the rig from the well, emergency disconnection procedures are required. Under emergency conditions during workover operations on a live well fitted with a horizontal tree, it may be necessary for the surface vessel to be detached from the well quickly. In such a situation it may not be possible to re-install wireline plugs, which would comprise the well pressure containment barrier, immediately prior to disconnection. Under these circumstances, the only pressure containment barrier available is the BOP stack and SSTT.

The first step in emergency disconnection of a horizontal tree is to close the upper ball valve in the SSTT to shear the wireline, causing it to fall into the well. Such shearing may damage the valve and affect its pressure integrity. The lower ball valve in the SSTT is then closed to contain the well.

Next, the quick disconnect within the SSTT is separated to allow the high pressure tubing riser to be retrieved. Then the LMRP is separated from the BOP, leaving the BOP in place over the well. The barriers left in place are the lower SSTT valve and the BOP shear rams. In the event that the SSTT has become damaged during the disconnection and must be retrieved for repair, the only available barriers are the BOP rams. The damaged SSTT and associated tubing hanger running tool must be "stripped" through the BOP ram seals under pressure, considered by many well operators to be an unacceptably hazardous procedure. The BOP stack rams are employed to seal around the tubing hanger running tool during its disconnection from the tubing hanger and withdrawal from the well to enable the SSTT to be retrieved, and once the tool has been removed the BOP rams are used to shut in the well. In this case there are no metal sealing barriers in place to contain the well. Re-establishment of metallic sealing barriers cannot be achieved with the hanger running tool, SSTT and their associated tubing riser removed, as the tubing hanger plug and tree cap cannot be installed.

In order to reduce dependency on the BOP stack and to accommodate situations where the BOP stack or SSTT may not be present, it is desirable to provide a reliable, self-closing well pressure containment barrier using equipment normally located within the christmas tree.

SUMMARY OF THE INVENTION

An object of the present invention is to provide independent means of well pressure containment in emergency conditions during workover operations when it may be necessary for the surface vessel to detach from the well, eliminating the need to rely on the BOP stack or SSTT to provide a pressure containing barrier. It is a further object of the present invention to provide such containment means, wherein the means are: present during normal operations, and remain in place during workover operations; located within the tree bore as a part of the christmas tree equipment; capable of sealing the well in emergency conditions; allowing the BOP stack to be a back up; and capable of sealing reliably, preferably through metal-to-metal sealing contact.

The present invention achieves these objectives by providing a safety valve comprising:

a valve body having a flow path therethrough;

a valve element having a longitudinal rotation axis and being rotatably mounted in said valve body;

a main bore extending through said valve element in a direction generally transverse to said longitudinal axis;

means for rotating said valve element into and out of a position in which said main bore aligns with said flowpath;

sealing means for forming a pressure seal between said valve body and said valve element, wherein said sealing means form a sealing surface on said valve element in which all points defined by said sealing surface are equidistant from said longitudinal axis.

The SSTT may then be made up to a tree cap intervention tool designed to engage the top plug or tree cap, rather than made up to the tubing hanger running tool, the valve being situated in the tree cap to provide readily openable and closeable well pressure containment independent of the BOP or SSTT. Accordingly, in a further aspect the invention provides a horizontal christmas tree cap comprising a through passage giving access to the well for workover operations, said passage being closable by a movable barrier. The cap is preferably internal, and the barrier is preferably a valve.

In a preferred embodiment the safety valve comprises a quarter-turn, metal-sealing valve mechanism having a cylindrical spool with a transverse main bore, which rotates in a cylindrical bore located within a plug that is received in the bore of a horizontal subsea christmas tree. The transverse main bore through the cylindrical spool is large enough to drift a wireline plug for installation at a lower location. A pair of saddle-shaped seats form a metal-to-metal seal between the plug body and the cylindrical spool. Each seat has a circumferential seal, preferably metal-to-metal, and an annular disc spring, or similar means, to provide preloading force. At each end of the spool there is a bore extending through at an angle of 45 degrees to the main bore. Each bore contains an opposed pair of rods with a compression spring positioned between the rods. The outer end of each rod is adapted to be received in a hole located in a corresponding piston. Each piston is located within the plug body and is aligned to reciprocate along an axis perpendicular to the longitudinal axis of the cylindrical spool. The axes of corresponding pistons at each end of the cylindrical spool are co-planar and the pistons are biased in the opposite direction from each other by a compression spring positioned at one end of each piston. Simultaneous movement of the corresponding pistons in an opposite direction from each other causes translation of the outer ends of each rod in opposite directions along the corresponding piston axis. The translation of the outer end of each rod is transferred to the cylindrical spool as rotational motion. The transverse main bore of the cylindrical spool controls the opening and closing of a flow path through the plug body. The compression springs positioned at the ends of the pistons bias each piston such that the cylindrical spool is in a closed position. The valve is opened by pressurizing a volume between a piston seal and an end cap at the end of each piston opposite the compression spring. The pressurization causes the piston to move against and overcome the compression spring force and to cause the cylindrical spool to rotate in to an open flow position.

Further, preferred features of the invention are in the dependent claims or will be apparent from the following description of an illustrative embodiment, made with reference to the drawings.

BRIEF DESCRIPTION OF THE DRAWINGS

FIG. 1 is a central sectional view of a horizontal tree assembly in production mode, diagrammatically illustrating the wellhead housing, tree connector, horizontal christmas tree, tubing hanger, BOP stack and SSTT with the LMRP disconnected.

FIG. 2 is an enlarged sectional view of the horizontal tree assembly shown in FIG. 1, illustrating the wellhead housing, tree connector, horizontal christmas tree, tubing hanger, valve element, and internal tree cap.

FIG. 3 is a sectional view of the valve open and close assembly of the present invention.

FIG. 4 is a section taken along 4—4 of FIG. 3 showing the valve in both the open and closed positions, on the left and right hand sides respectively.

FIG. 5 is a section taken along 5—5 of FIG. 4 illustrating the metal sealing arrangement between the spool and the body.

DESCRIPTION OF THE PREFERRED EMBODIMENT

A horizontal tree assembly, shown in FIGS. 1–2, includes a wellhead 10 fitted with a tree connector 12 and a horizontal christmas tree 14. A tubing hanger 16 is installed in the christmas tree 14. Other tubing hangers 17 support other tubing strings 19. A flowpath 18 runs through the central bore of the wellhead 10 through the christmas tree 14 and through the tubing hanger 16. A production outlet 20 passing through the tubing hanger 16 and christmas tree 14 runs horizontally. A production master valve 22 and a wing valve 24 are positioned along the production outlet 20. An annulus outlet 26 is positioned on the christmas tree 14 shown opposite the production outlet 20. An internal tree cap 28, having a valve element 30 is installed in the bore at the top of the horizontal christmas tree 14, above the tubing hanger 16, FIG. 2. A hanger plug 31 is installed in the hanger 16. A blow out preventer (BOP) 32 is installed over the mandrel profile at the top of the horizontal tree 14 which includes the internal tree cap 28. A tree cap intervention tool 34 which may be the tubing hanger running tool, is installed through the BOP 32 and operatively engages the tree cap 28. A subsea test tree assembly (SSTT) 36, including upper and lower valves 38, 40, is also installed within the BOP 32, in which the shear rams 42 are arranged above the SSTT 36 in the BOP 32.

In the described embodiment, the outside diameter of the tree cap 28 forms a metal-to-metal seal 44 with the inside diameter of the horizontal tree 14. The tree cap 28 provides a well pressure barrier. In order to provide sealing means which are independent of the BOP 32 and the SSTT 36, present during both normal and workover operations, and capable of sealing during emergency disconnections, the tree cap 28 is provided with a valve element 30.

As shown in FIGS. 3–5, the valve element 30 comprises a valve body 46 mounted in the tree cap 28. A cylindrical spool 48 is supported for rotation about its longitudinal axis in the valve body 46. The cylindrical spool 48 has a transverse main bore 50 extending perpendicular to the longitudinal axis which, when aligned with the flowpath 18, allows flow through the valve 30. The main bore 50 is located approximately equidistant from the ends of the spool 48 and is large enough in diameter to permit passage of the hanger plug 31 to place the tree into and out of workover mode. A pair of saddle-shaped seats 52 are seated within seat pockets 54 in the valve body 46 and engage the cylindrical spool 48, forming a metal-to-metal seal between the valve body 46 and the cylindrical spool 48. Two circumferential back up seals 49 are provided on the spool 48 on either side of the transverse bore 50 as a secondary means of isolating the production fluid flowing through the transverse bore 50 and the control fluid or pressurized medium providing for rotation of the cylindrical spool 48. Each seat 52 is provided with spring means 56, positioned in contact with the radial surface of the corresponding seat pocket 54, which resiliently bias the seat 52 against the cylindrical spool 48. The spring means 56 may be in the form of a disc spring or other suitable spring. Each seat 52 is further provided with a circumferential seal 58, which may be metal sealing, between the seat 52 and the circumferential surface of the seat pocket 54.

Near each end of the spool 48 exists a bore 59 extending perpendicularly to the longitudinal axis and at an angle of approximately 45 degrees to the main bore 50. An opposed pair of rods 60 having a compression spring 62 positioned between them extends through each bore 59. The outer end 64 of each rod 60 is received in a hole 66 located in a corresponding piston 68. Each piston 68 is located within a passage in the valve body 46 and is aligned to reciprocate along an axis generally perpendicular to the longitudinal axis of the spool 48. The axes of corresponding pistons 68 at each end of the spool 48 are co-planar and the pistons 68 are biased in the opposite direction from each other by a compression spring 70 positioned at one end of each piston 68. Simultaneous movement of the corresponding pistons 68 in opposite directions from each other causes translation of the outer ends 64 of each connecting rod 60 in opposite directions along the corresponding piston axis. The translation of the outer ends 64 of each rod 60 is transferred to the cylindrical spool 48 as rotational motion. The rotation of the spool 48 causes the main bore 50 to align with the flowpath 18 for the valve open position or to rotate out of alignment for the valve closed position. The compression springs 70 at each end of the pistons 68 bias each piston 68 such that the spool 48 is in a closed position. Activation of the pistons 68 cause the spool 48 to rotate to an open position.

The pistons 68 are activated by introducing a pressurized medium at the end 72 of each piston 68 opposite the compression spring 70. To receive the pressurized medium, a volume is enclosed by an annular piston seal 74 which forms a seal between the outer diameter of each piston 68 and the inner diameter of the passage in which it is located, and by an annular end cap seal 76 which forms a seal between the same passage and an end cap 78 placed over the passage. The end cap 78 is held in place on the valve body 46 by end cap screws 80. The pressurized medium may be introduced into the enclosed volume through conventional means such as a hydraulic port. By fitting a unidirectional circumferential seal 84 at the opposite end of the piston 68, the chamber 86 may be vented to accommodate volumetric changes, and allows the valve to be closed by introducing a pressurized medium into the vent port 82 to bias the pistons 68 to a return position, in addition to the spring force generated by compression springs 70.

Although the best mode contemplated for carrying out the present invention has been herein shown and described, it will be apparent that modification and variation may be made without departing from what is regarded to be the subject matter of the invention as defined in the claims.

I claim:

1. A safety valve assembly for use in a well christmas tree having a bore extending therethrough and a tree cap mounted adjacent the bore near the top of the christmas tree, the safety valve assembly comprising:

a valve body mounted in the tree cap, the valve body having a flow path therethrough in communication with the bore;

a cylindrical valve element having a longitudinal rotation axis and being rotatably mounted in said valve body;

a main bore extending through said valve element in a direction generally transverse to said longitudinal axis;

means for rotating said valve element into and out of a position in which said main bore aligns with said flowpath;

sealing means for forming a pressure seal between said valve body and said valve element.

2. The safety valve in accordance with claim 1, wherein said means for rotating said valve element comprises a hydraulic member.

3. A safety valve according to claim 2, wherein said hydraulic member comprises a first piston reciprocally mounted in a first piston groove in said valve body towards one end of said valve element.

4. The safety valve in accordance with claim 3, wherein said hydraulic member comprises a second piston reciprocally mounted in a second piston groove in said valve body directed opposite said first piston.

5. The safety valve in accordance with claim 4, wherein a second pair of pistons are carried in said valve body.

6. The safety valve in accordance with claim 5, wherein said means for rotating said valve element further comprises means for engaging each piston mounted in said valve body and adapted to transfer movement of each said piston to said valve element whereby rotation of said valve element will be accomplished by movement of said pistons.

7. A safety valve according to claim 6, wherein said means for engaging each piston comprises:

a through bore towards an end of said valve element, wherein said through bore is generally transverse to said longitudinal axis and angularly offset from said main bore; and a pair of opposed rods inserted into opposite ends of the through bore and separated by a compression spring positioned in the through bore between the rods, whereby the outer end of each of said rods extends into one said piston such that when said piston is actuated said rod outer end moves with said piston causing said valve element to rotate.

8. A safety valve according to claim 7, wherein each said through bore is offset from said main bore by approximately 45 degrees.

9. A safety valve according to any claims 8, further comprising:

a first sealed pressure chamber located at a first end of the piston; and a pressurized medium source in communication with the first pressure chamber, whereby a pressurized medium originating from said pressurized medium source is introduced into the first pressure chamber, thereby causing each piston to extend such that said valve element is moved to a valve open position.

10. A safety valve according to claim 9, wherein said valve element is provided with sealing means for sealing between said pressurized medium and production fluid flowing through said flow path or main bore.

11. A safety valve according to claim 10, further comprising:

biasing means seated in the piston groove adjacent the end of the piston opposite the first pressure chamber, whereby said biasing means is energized when said piston extends to said valve open position and, upon release of pressure from the first pressure chamber, said biasing means exerts force upon said piston to return the piston such that said valve element is moved to a valve closed position.

12. A safety valve according to claim 11, further comprising:

a second pressure chamber adjacent to the piston and opposite the first pressure chamber; and a vent port corresponding to the second pressure chamber, wherein the valve may be closed by introducing a pressurized medium into the vent port to bias the piston to a return position.

13. A safety valve according to claim 12, further comprising:

an annular piston seal received in an annular groove around said first end of the piston; and an end cap arranged to seal one end of said piston groove.

14. A safety valve according to claim 13, wherein said valve element is provided with sealing means for sealing between said main bore and said hydraulic member.

* * * * *